M. DAXE.
ANTISKID DEVICE FOR VEHICLE WHEELS.
APPLICATION FILED AUG. 20, 1917.
1,274,392.
Patented Aug. 6, 1918.
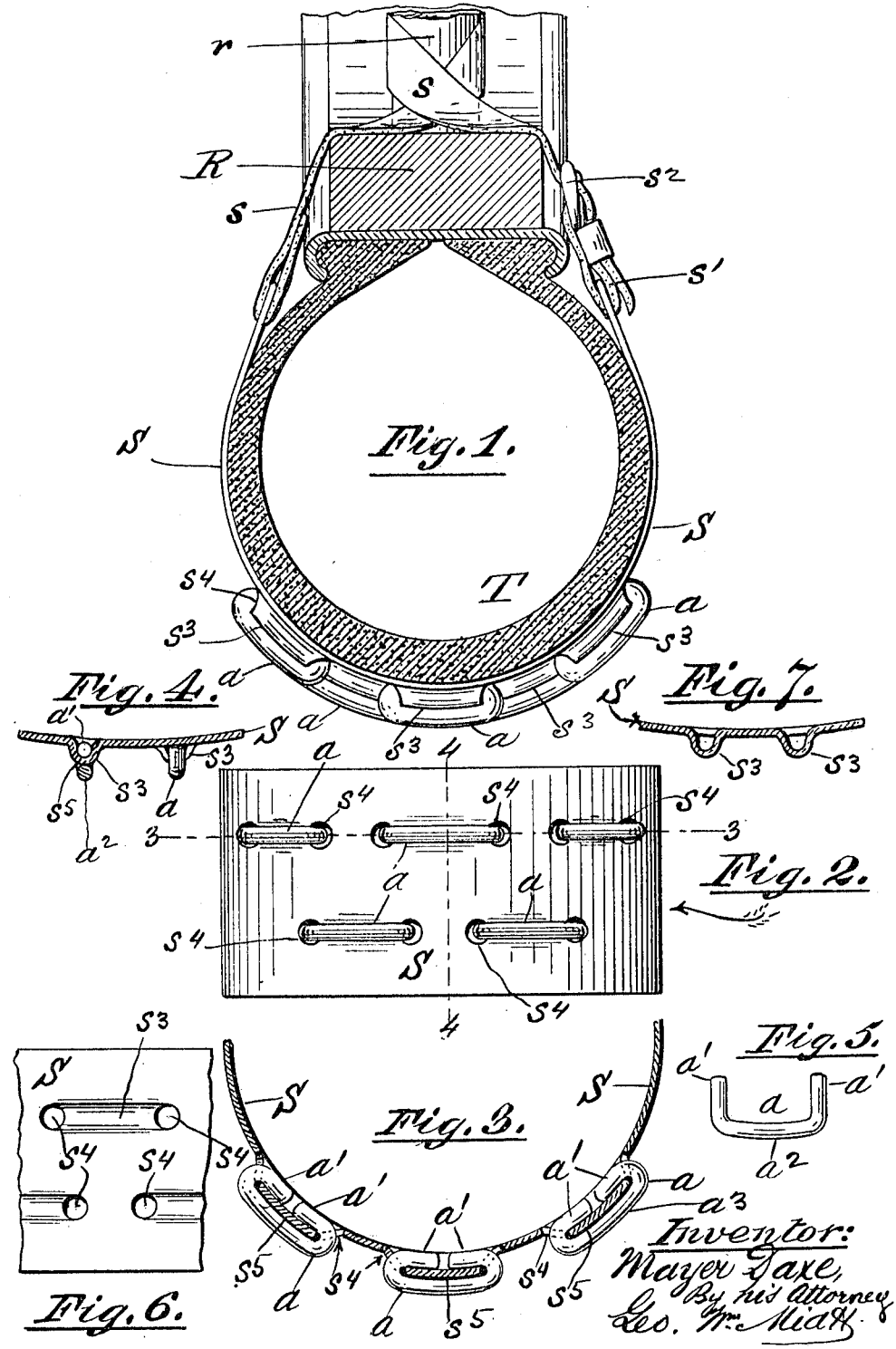

UNITED STATES PATENT OFFICE.

MAYER DAXE, OF NEW YORK, N. Y.

ANTISKID DEVICE FOR VEHICLE-WHEELS.

1,274,392.   Specification of Letters Patent.   Patented Aug. 6, 1918.

Application filed August 20, 1917. Serial No. 187,034.

*To all whom it may concern:*

Be it known that I, MAYER DAXE, a citizen of the United States, and a resident of the borough of Manhattan, city, county, and State of New York, have invented certain new and useful Improvements in Antiskid Devices for Vehicle-Wheels, of which the following is a specification.

The main object of my invention is to afford a simple, cheap and effective and durable anti-skid attachment for vehicle wheels, particularly those of the automobile type having tires provided with rubber or relatively soft composition treads, the protection of which from actual contact with the frictional grippers is an important desideratum. My improvements relate to the type of anti-skid device illustrated in my concurrent application No. 164,321, filed April 25, 1917. By my present invention I simplify and cheapen the structure of my anti-skid device,—the distinctive feature being the provision of a plurality of individual gripping staples each consisting of a suitable length of metallic rod or wire, the ends of which are inturned into recesses or sockets counter sunk for them in the inner side of the shield plate,—the medial portion of each length of metal forming an external peripheral tooth or protuberance on the shield adapted to perform the function of a resistant as hereinafter more fully set forth.

In the accompanying drawings,

Figure 1, is a transverse sectional elevation of a wheel tire to which my improved anti-skid device is applied;

Fig. 2, is a view of the contact face of the anti-skid shield;

Fig. 3, is a sectional elevation taken upon plane of line 3—3, Fig. 2;

Fig. 4, is a section taken upon plane of line 4—4, Fig. 2;

Fig. 5, is a detail view of a resistant blank or staple;

Fig. 6, is a view of the inner side of a portion of the shield plate, the staples being omitted;

Fig. 7, is a view like unto Fig. 4, the staples being omitted, and the corrugations on the shield plate forming the resistants.

The tire tread T, may be of any desired shape or construction, that shown in the drawing being of the clencher type, and the inner tube being omitted. R, is the rim of the wheel and $r$, a spoke thereof.

S, is the tread shield, consisting preferably of a strip of elastic resilient sheet metal bent and formed to snugly fit the peripheral surface of the tread T. This shield may be held in position on the tread by any suitable means, the means preferred and shown consisting of a longer strap $s$, attached to one extremity of the shield S, and a shorter strap $s'$, attached to the other extremity of the shield,—the longer strap $s$, being adapted to be passed over the rim R, and wound around a spoke $r$, of the wheel, as indicated in Fig. 1, the ends of the straps being secured by a buckle $s^2$, or equivalent fastening device. The passing of the strap $s$, around the spoke $r$, prevents twisting and distortion of the shield plate *in situ* on the tread, and also counteracts the tendency of the shield to creep longitudinally along the tread when in use.

The shield plate S, is formed with protuberant corrugations or embossments $s^3$, arranged transversely, or substantially so, as related to the tread T, to which the device is applied, or in other words extending in the direction of the length of the shield, or substantially so. These protuberant embossments $s^3$, may alone be relied upon to act as anti-skid ridges or frictional resistants, as in Fig. 7, but I prefer to supplement them with frictional grippers consisting of metallic staples $a$, the ends $a'$, of which are inturned within the embossments $s$, which latter thus perform the function of sockets for said inturned ends of the staples. To this end the extremities of the embossments $s^3$, are formed with openings $s^4$, to admit of the insertion of the ends $a'$, of the staples $a$; and the internal depth of said embossments $s$, is at least equal to the thickness or cross section of the metallic rod or wire from which the staples are formed so that said inturned ends $a'$, $a'$, will not press upon the periphery of the tread T, and this means of protecting the tread T, is further safeguarded by clenching the ends $a'$, of the staples $a$, down firmly against the medial portions $s^5$, of the embossments $s^3$, as shown in Figs. 3 and 4, so that said medial portions $s^5$, of these embossments bear the brunt of the pressure caused by the contacting of the medial portions $a^2$, of the staples $a$, with the ground,—the direct strain engendered being distributed equally by the relatively broad bearing of the inner surface of the shield S, on the peripheral surface of the tread with which said shield contacts.

The frictional grippers or staples $a$, are preferably made of iron or steel rod or wire of circular cross section, although I do not limit myself in this respect either as to material or shape, the essential feature being the use of frictional grippers the ends of which are inturned and held within the embossments $s^3$, formed in the shield S, whereby frictional "purchase" or resistance on the road traversed is augmented, especially in a direction transverse to the wheel.

When worn out the staples $a$, may be readily and cheaply replaced by others, without discarding or impairing the shield S, any desired number of which may be applied to a wheel tire as may be found expedient; and they may be readily and conveniently attached or detached as required.

What I claim as my invention and desire to secure by Letters Patent is,

1. In an anti-skid device of the character designated, a tread shield formed to snugly fit the peripheral surface of the tread, and also formed with elongated externally protuberant embossments with openings at the extremities thereof, frictional gripping staples the ends of which are inturned within said embossments, and means for securing the shield in position on the tread, for the purpose described.

2. In an anti-skid device of the character designated, a tread shield formed to snugly fit the peripheral surface of the tread, and also formed with elongated externally protuberant embossments with openings at the extremities thereof, frictional gripping staples the ends of which are inturned within said embossments and clenched against the medial parts thereof, and means for securing the shield in position on the tread, for the purpose described.

MAYER DAXE.

Witnesses:
GEO. WM. MIATT,
DOROTHY MIATT.

Copies of this patent may be obtained for five cents each, by addressing the "Commissioner of Patents, Washington, D. C."